United States Patent [19]
Farfan et al.

[11] Patent Number: 5,875,231
[45] Date of Patent: *Feb. 23, 1999

[54] TELEPHONE CALL ON HOLD SERVICE FOR A PARTY PLACED ON HOLD BY ANOTHER PARTY

[75] Inventors: Daniel Joseph Farfan; Richard James Dobrovich, both of Phoenix, Ariz.

[73] Assignee: AG Communication Systems Corporation, Phoenix, Ariz.

[ * ] Notice: This patent issued on a continued prosecution application filed under 37 CFR 1.53(d), and is subject to the twenty year patent term provisions of 35 U.S.C. 154(a)(2).

[21] Appl. No.: 686,780

[22] Filed: Jul. 26, 1996

[51] Int. Cl.⁶ .............................. H04M 1/64; H04M 3/42
[52] U.S. Cl. .................. 379/67; 379/76; 379/77; 379/88.01; 379/88.11; 379/201; 379/207; 379/211; 379/212; 379/393
[58] Field of Search .................. 379/67, 88, 89, 379/67.1, 76, 77, 88.01, 88.11, 201, 207, 211, 212

[56] References Cited

U.S. PATENT DOCUMENTS

| 4,757,525 | 7/1988 | Matthews et al. | 379/89 |
| 5,325,421 | 6/1994 | Hou et al. | 379/67 |
| 5,557,658 | 9/1996 | Gregorek et al. | 379/67 |

*Primary Examiner*—Fan S. Tsang
*Assistant Examiner*—Allan Hoosain
*Attorney, Agent, or Firm*—Gregory G. Hendricks

[57] ABSTRACT

An on hold telephony service that allows a party placed on hold, if he is a subscriber to the service, to also place the call on hold and then hang up. The on hold service can be implemented on a central office switch or an enhanced services platform connected to the switch. The on hold service is accessed by the party placed on hold, i.e., subscriber, through a transfer function that causes the call to be maintained by the on hold service. When the party who originally placed the call on hold returns to the call, the on hold service informs him that the service will then call the subscriber so that both parties can be reconnected.

10 Claims, 14 Drawing Sheets

TELEPHONE CALL ON HOLD SERVICE FOR A PARTY PLACED ON HOLD BY ANOTHER PARTY

CROSS REFERENCE TO RELATED APPLICATIONS

Cross reference is made to the related U.S. patent applications entitled: "Games On Hold Telephony Service" Ser. No. 08/686,778; and "Information on Hold Telephony Service" Ser. No. 08/686,779 filed on the same date, and by the same assignee as this Application.

FIELD OF THE INVENTION

The present invention relates to telephony service and more particularly to a service which allows a party that has been placed on hold to also place the call on hold.

BACKGROUND OF THE INVENTION

Call on hold service is old and well known. Typically, when a party wishes to place another party on hold, the party placing the call on hold presses the hold button on his telephone. His telephone, or the associated PABX or central office switch, then maintains the connection to the other party while allowing the party who placed the call on hold to hang up. Such call on hold services also typically provide a music or announcement on hold feature, which causes music or voice to be played over the line to the party placed on hold. Such call on hold services are useful to the party who places the call on hold, but are often a cause of discontent to the party who has been placed on hold, even if he is provided with music to listen to while on hold. If the call has been received on a speaker phone, the party placed on hold can do things other than merely wait on the telephone for the other party to return. In this case the party placed on hold can hang up the telephone and listen for the return of the other party via the speaker. However, this arrangement still requires the party placed on hold to remain attentive to the speaker phone to determine when the other party returns.

Accordingly, it is an object of the present invention to allow a party placed on hold to dispose of the call until the other party returns, and then be notified of such return, e.g., by a ringing telephone, so the party placed on hold can then request reconnection to the other party.

SUMMARY OF THE INVENTION

The on-hold system of the present invention, referred to as holder-on-hold, typically includes a computer such as an enhanced services platform (ESP) connected to a central office or other switching system. The holder-on-hold software is resident on the ESP and can be accessed by a subscriber to the holder-on-hold system when he has been put on hold by another party to a telephone call.

The subscriber accesses the holder-on-hold system through a transfer or direct access function. When so accessed the holder-on-hold system instructs the subscriber to hang up his telephone in order to activate the holder-on-hold service. When the subscriber hangs up the switching system connects the other party to the ESP and disconnects the subscriber from the ESP. The holder-on-hold system then maintains the telecommunication path between the ESP and the party who originally placed the subscriber on hold.

DESCRIPTION OF THE PREFERRED EMBODIMENT

Figure 1:
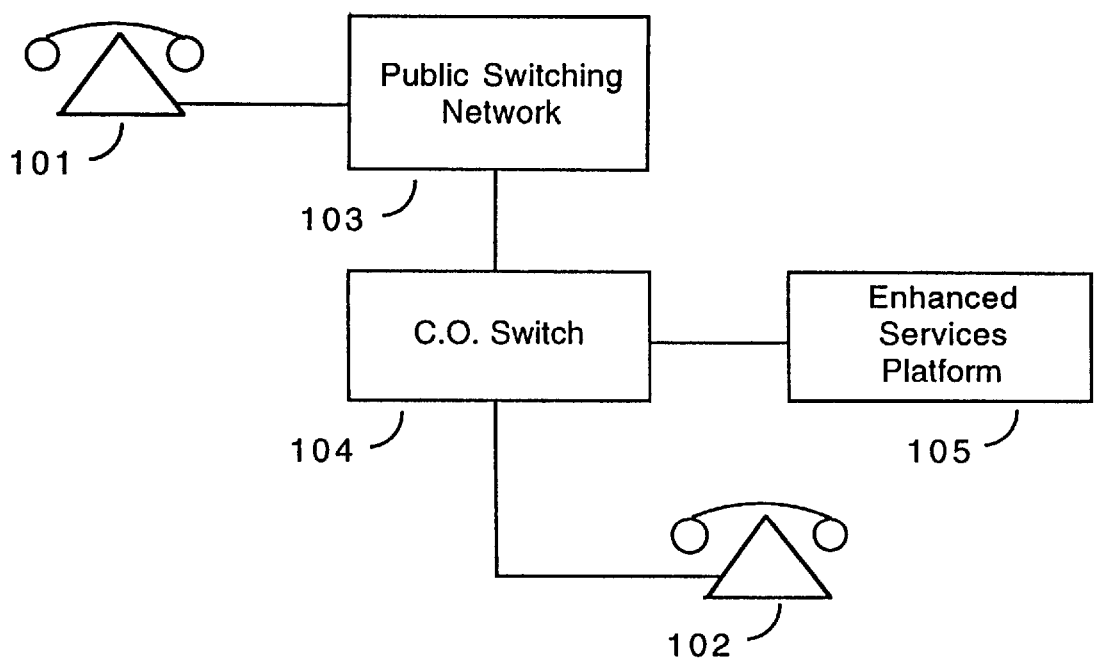
FIG. 1 of the accompanying drawing is a block diagram of a telephone system utilizing the on-hold service of the present invention.

The on-hold service of the present invention can be implemented on a central office switch, a PABX, or on an enhanced services platform or other computer, e.g., personal computer or work station, connected to such a switch or PABX. FIG. 1 shows the preferred embodiment of the present invention in which two parties could be connected together via a central office switch and the on-hold service would be implemented on an enhanced services platform. The on-hold service of the present invention allows a party placed on hold to then place the other party on hold. Accordingly, that service is referred to as holder-on-hold service.

Referring now to FIG. 1, telephone 101 is used by Party A to connect to telephone 102 which is used by Party B. The connection between telephone 101 and telephone 102 is via public switching network 103 and central office switch 104. If, however, Party A were connected to central office switch 104, then there would be no need for the call to be placed through the public switching network 103 but rather Party A would be connected to Party B via central office switch 104 only.

Once Party A places Party B on hold, and central office switch 104 maintains that hold connection, Party B can access the holder-on-hold service by utilizing the transfer function or hook switch flash. Central office switch 104 responds to the hook switch flash generated by the hook switch or transfer button by transferring the call to enhanced services platform 105 and the holder-on-hold software implemented thereon. Party B can then hang up the telephone and the call is then maintained by central office switch 104 and enhanced services platform 105.

When Party A returns to the call the connection to the call is maintained by telephone 101 rather than central office switch 104, and the holder-on-hold software rings Party B's telephone 102, via central office switch 104, to inform him that Party A has returned to the call. Once Party B answers the call the holder-on-hold software causes Party B's telephone 102 to be connected to Party A's telephone 101 by switching the call through a network in enhanced services platform 105. The call path then extends from telephone 101, through central office switch 104, through the network of enhanced services platform 105, back through central office switch 104, and then to Party B's telephone 102.

Figure 2:
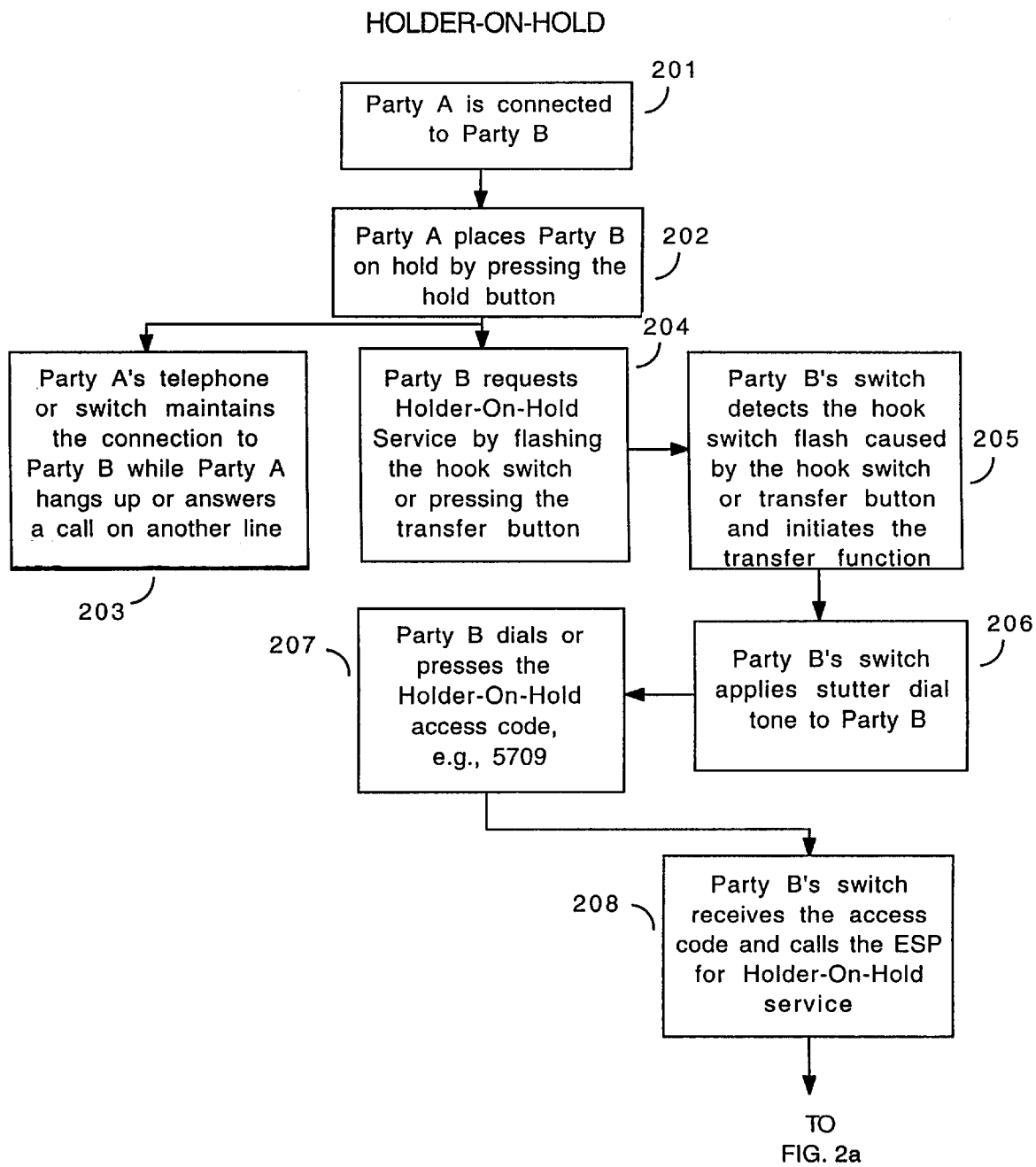
FIGS. 2–11 of the accompanying drawing are flow charts of the on-hold service of the present invention.

The actual operation of the holder-on-hold service is shown in FIGS. 2–12. Referring now to FIG. 2, Party A is initially connected to Party B (block 201). The connection is via public switching telephone network 103 and CO switch 104, unless Party A is connected directly to the same switch 104 as Party B. In the latter case Party A would be connected to Party B via CO switch 104 only. Party A then places Party B on hold by pressing the hold button on telephone 101 (block 202). Party A's telephone 101 then maintains the loop connection to Party B's telephone 102 while allowing Party A to hang up or answer a call on another line (block 203).

Upon being placed on hold by Party A, Party B may desire to access the holder-on-hold service available to him via the holder-on-hold software installed on enhanced services platform 105. To access the holder-on-hold service, Party B either presses the transfer button on telephone 102, if it is so equipped, or flashes the hook switch on telephone 102 (block 204).

Operation of the transfer button results in an on hook signal similar to that caused by flashing the hook switch.

Central office switch 104 then detects Party B's hook switch flash, caused by either the hook switch or the transfer button, and initiates the transfer function (block 205). Party B's switch then applies stutter dial tone to Party B's telephone (block 206) and Party B then dials or presses the holder on hold access code, e.g., 5709 (block 207). Party B's switch then receives the access code, determines that the call is to be transferred to the enhanced services platform (ESP) and places a call to the ESP (block 208).

Figure 2A:
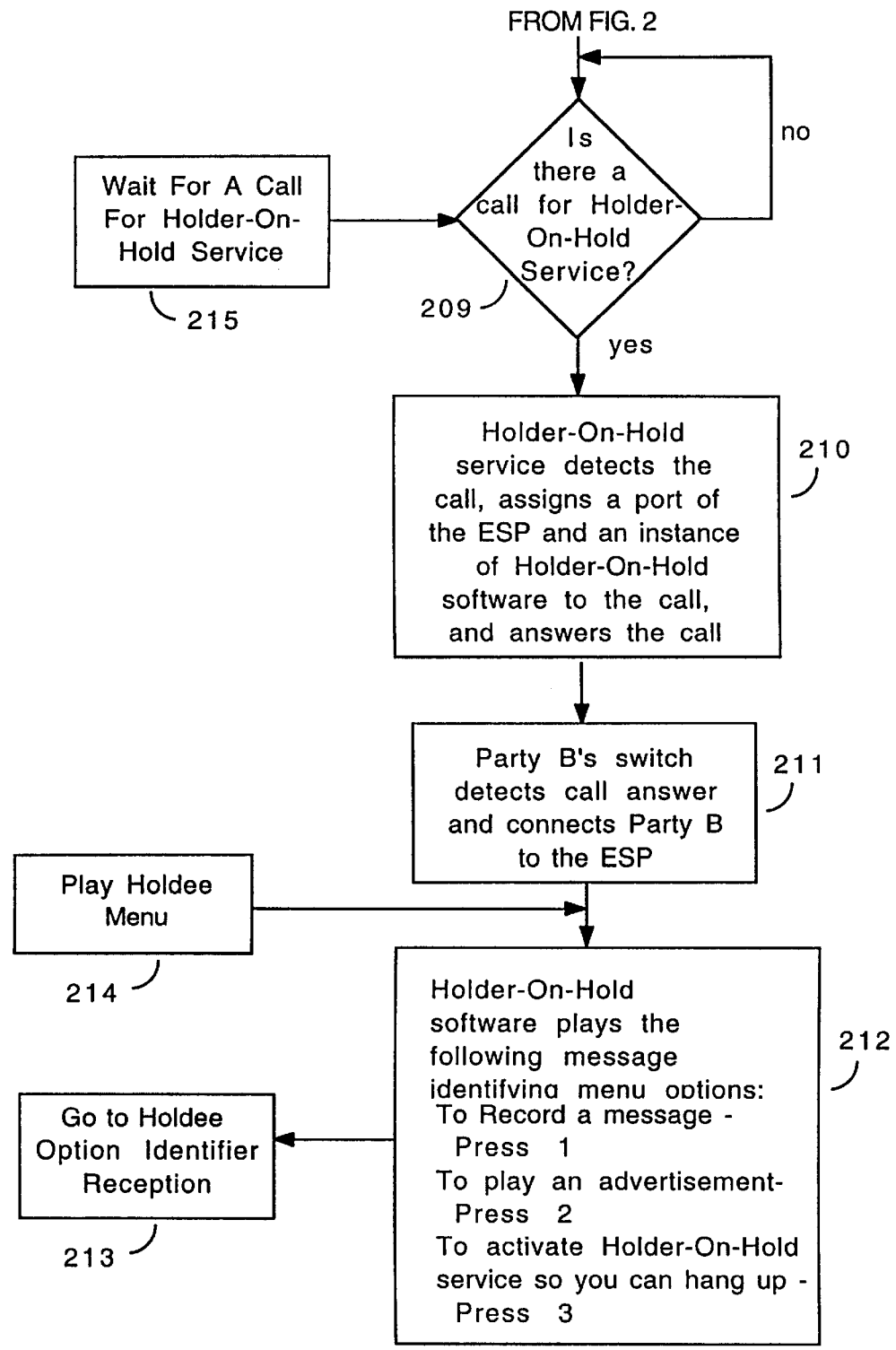

Referring now to FIG. 2A, the holder-on-hold software resident on the ESP waits in a loop for detection of a call for holder-on-hold service (block 209). When the holder-on-hold software detects the call placed by Party B's switch it assigns a port of the ESP and an instance of the holder-on-hold software to that call. The holder-on-hold software then causes answer supervision to be applied to Party B's switch, thereby answering the call (block 210). Party B's switch then detects the call answer signal and connects Party B to the ESP (block 211).

Once Party B is connected to the ESP the instance of holder-on-hold software assigned to the port to which Party B is connected, plays a message identifying various menu options available to Party B. Those menu options include the option to press 1 to record a message, press 2 to play an advertisement, and press 3 to activate the holder-on-hold service so Party B, the holdee, can hang up (block 212). The holder-on-hold software then enters the Holdee Option Identifier Reception mode of operation (block 213). Various other modes of operation of holder-on-hold software can also cause the foregoing message options to be played by entering the Play Holdee Menu mode of operation (block 214). And, once holder-on-hold service has been completed for a call, the holder-on-hold software waits for another such call which can access the holder-on-hold software at the Wait For A Call For Holder-On-Hold Service mode of operation (block 215).

Figure 3:
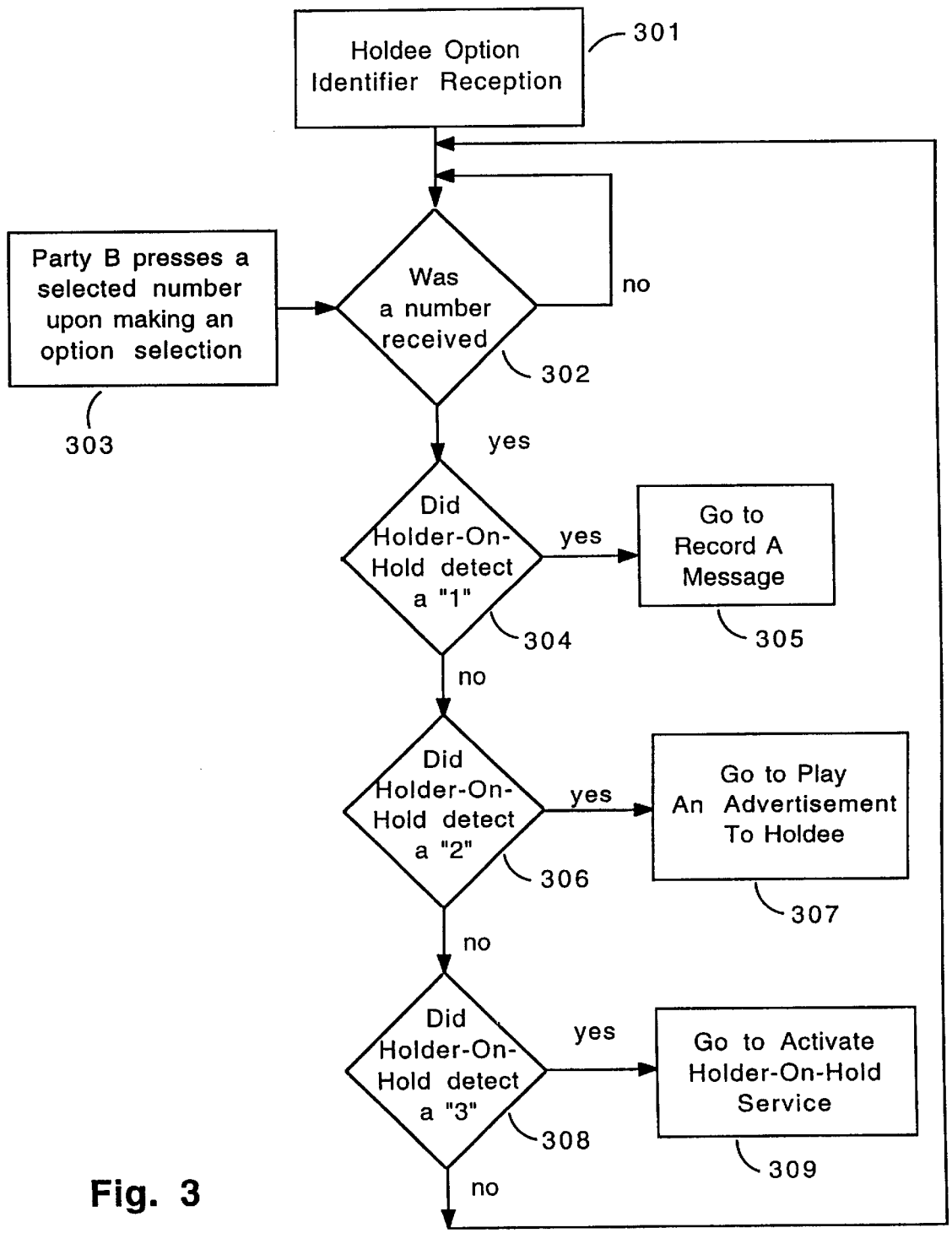

Referring now to FIG. 3 the holder-on-hold software enters the Holdee Option Identifier Reception mode of operation at block 301. The holder-on-hold software then waits in a loop operation for the reception of a number from Party B indicating the option he has selected (block 302). When Party B presses a selected key pad number on his telephone to indicate the selection of a particular option (block 303), a DTMF receiver in the ESP receives that number, and it is detected by the holder-on-hold software (block 302).

Once a number has been received the holder-on-hold software then tests that number to determine which option has been selected by Party B. If the holder-on-hold software detects a number 1 from Party B (block 304), the holder-on-hold software then goes to the Record A Message mode of operation (block 305). If the holder-on-hold software detects a number 2 from Party B (block 306), it then goes to the Play An Advertisement To Holdee mode of operation (block 307). And if the holder-on-hold software detects a number 3 from Party B (block 308), it then goes to the Activate Holder-On-Hold Service mode of operation (block 309).

Figure 4:
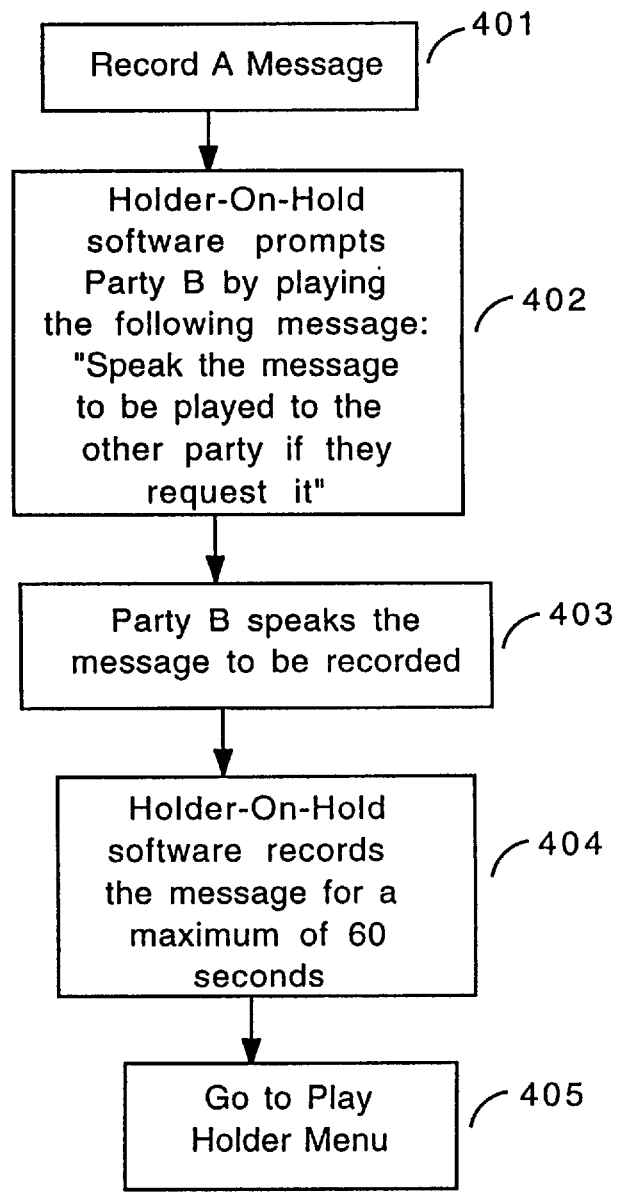

Referring now to FIG. 4 the holder-on-hold software enters the Record A Message mode of operation at block 401. In this mode of operation the holder on hold software prompts Party B by playing a message asking him to speak the message he wants played to the other party in event the other party should request that such a message be played to him (block 402). Party B then speaks the message to be recorded by the holder-on-hold software for subsequent playing to Party A, should Party A request it to be so played (block 403). The holder-on-hold software then records the message spoken by Party B for up to a maximum of a 60 second message (block 404). The holder-on-hold software then transfers to the Play Holder Menu mode of operation (block 405) to allow the holder, i.e., Party A, to select an option.

Figure 5:
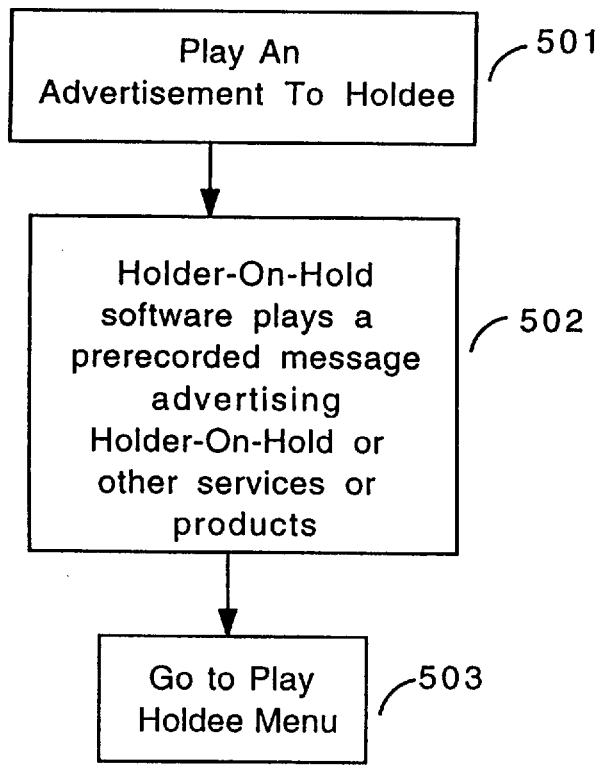

Referring now to FIG. 5 the Play An Advertisement To Holdee mode of operation is shown at block 501. In this mode of operation the holder-on-hold software plays a prerecorded message advertising holder-on-hold service or other services or products (block 502). The holder-on-hold software then goes to the Play Holdee Menu mode of operation (block 503), to allow the holdee, i.e., Party B, to select another option.

Referring back to FIG. 2A the Play Holdee Menu mode of operation is entered at block 214 to cause the holder-on-hold software to play the message identifying the various menu options once again (block 212). The holder-on-hold software then goes to the Holdee Option Identifier Reception mode of operation (block 213) to wait for Party B's selection of the next option.

Referring again to FIG. 3 the holder-on-hold software again enters the Holdee Option Identifier Reception mode of operation (block 301). If Party B presses number 3 (block 303) that number would then be received in block 302 and detected as a number 3 in block 308, causing the holder-on-hold software to go to the Activate Holder-On-Hold Service mode of operation (block 309).

Figure 6:
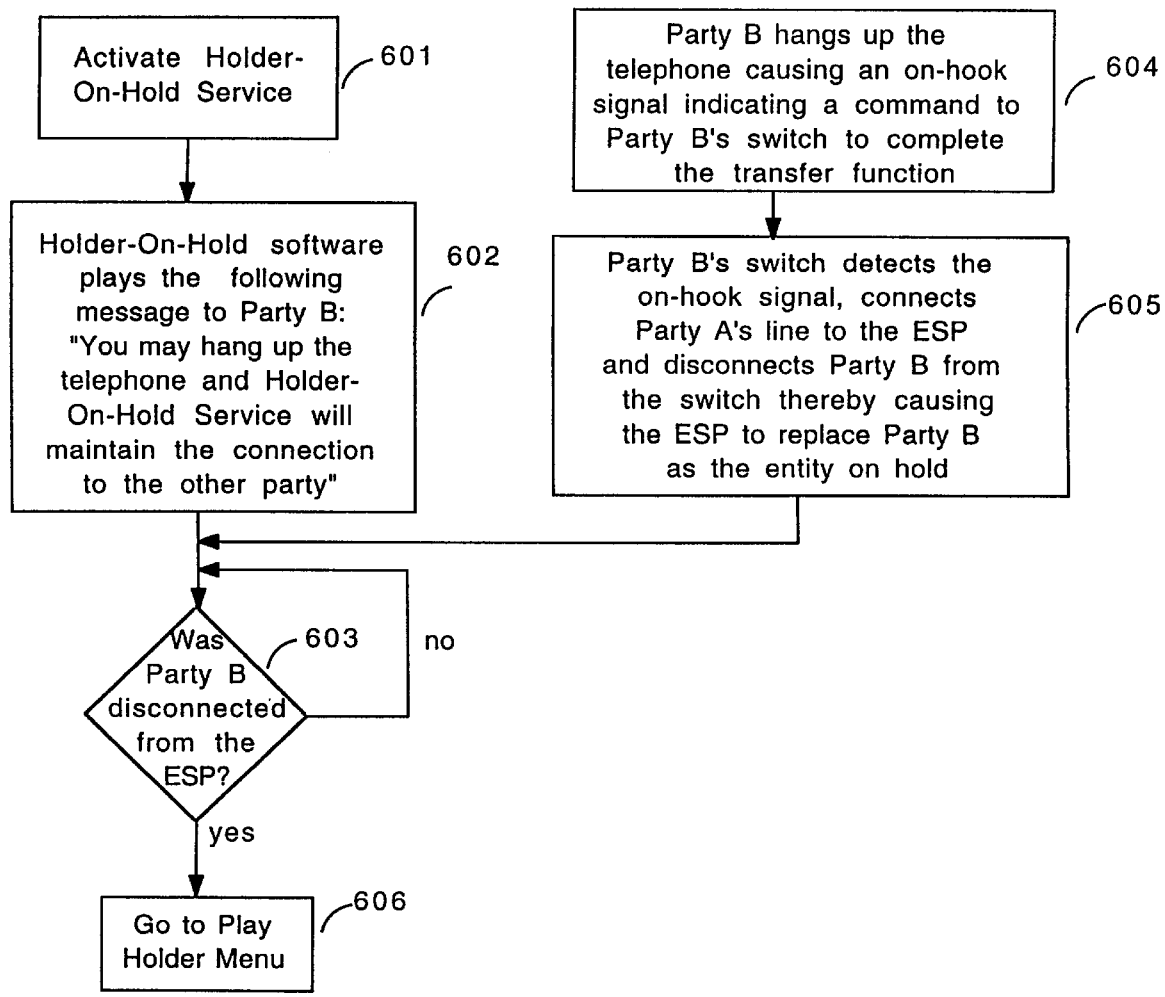

Referring now to FIG. 6 the holder-on-hold software enters the Activate Holder-On-Hold Service mode of operation at block 601. In this mode of operation the holder-on-hold software plays a message to Party B informing him that he may hang up the telephone and the holder-on-hold service will maintain the connection to the other party (block 602). The holder-on-hold software then waits for Party B to be disconnected from the ESP (block 603) and Party B then hangs up the telephone causing an on-hook signal to be generated which indicates a command to Party B's central office switch to complete the transfer function (block 604). Party B's switch then detects the on-hook signal, connects Party A's line to the ESP and disconnects Party B from the switch, thereby causing Party B to be replaced by the ESP as the entity on hold (block 605). When the holder-on-hold software detects that Party B was disconnected it then goes to the Play Holder Menu mode of operation (block 606).

Figure 7:
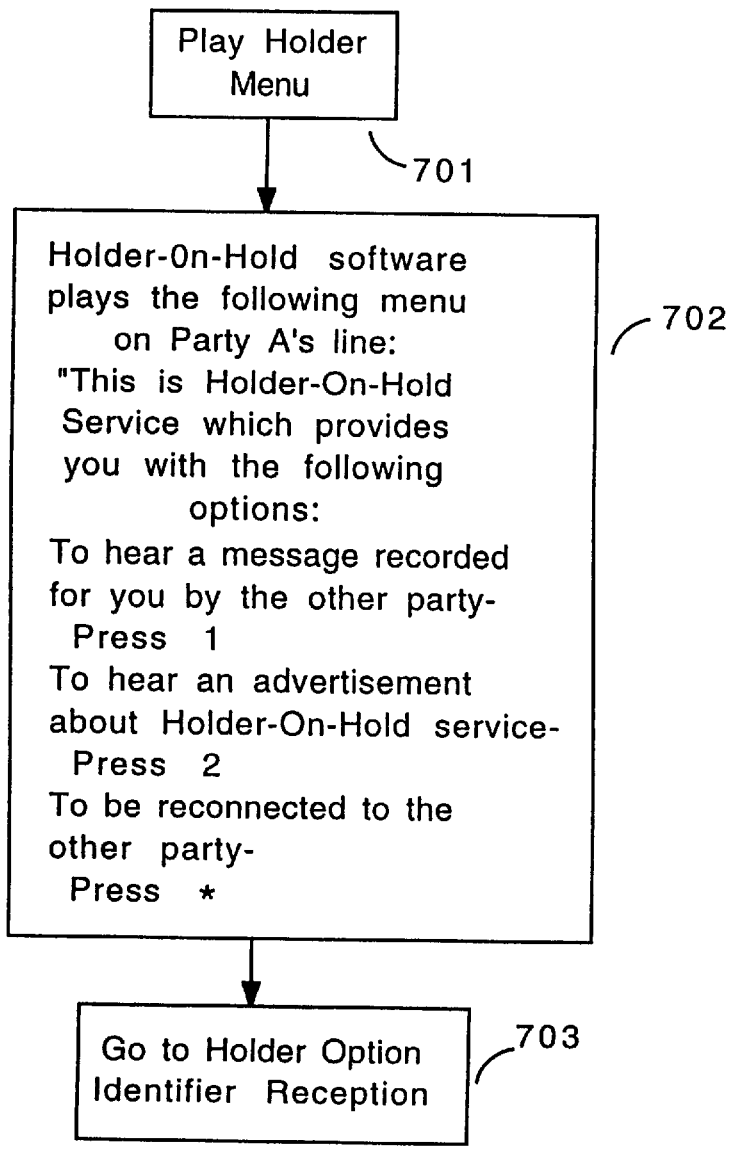

Referring now to FIG. 7 the holder-on-hold software enters the Play Holder Menu mode of operation, where it plays a menu to the holder, i.e., Party A (block 701). In this mode of operation, the holder-on-hold software plays a menu on Party A's line informing him that if he presses 1 he can hear a message recorded for him by the other party, i.e., Party B, the holdee; that if he presses 2 he can hear an advertisement about the holder-on-hold service; and that if he presses the star button he will be reconnected to the other party, i.e., Party B (block 702). Various other modes of operation of the holder-on-hold software can also cause the foregoing message options to be played by entering the Play Holder Menu (block 701). The holder-on-hold software then goes to the Holder Option Identifier Reception mode of operation (block 703).

Figure 8:
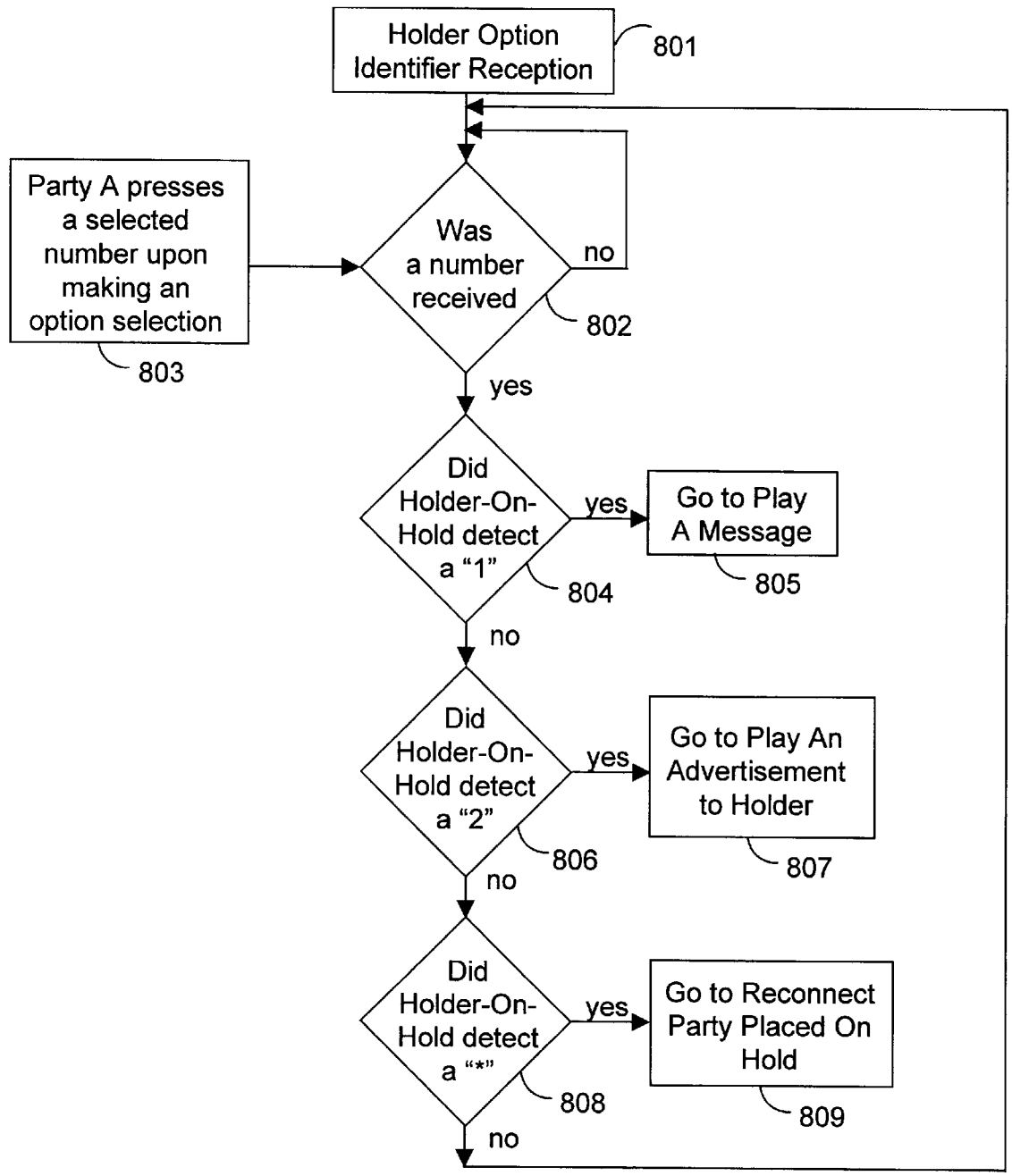

Referring now to FIG. 8 holder-on-hold software enters the Holder Option Identifier Reception mode of operation at block 801. The holder-on-hold software then waits in a loop operation for the reception of a number from Party A indicating the option he has selected (block 802). When Party A presses a selected key pad number on his telephone to indicate the selection of a particular option (block 803) a DTMF receiver in the ESP receives that number, and it is detected by the holder-on-hold software (block 802).

Once a number has been received, the holder-on-hold software then tests that number to determine which option has been selected by Party A. If the holder-on-hold software detects a number 1 from Party A (block 804) the holder-on-hold software then goes to the Play A Message mode of operation (block 805). If the holder-on-hold software detects a number 2 from Party A (block 806) it then goes to the Play An Advertisement To Holder mode of operation (block 807). And if the holder-on-hold software detects that the star (*) button has been pressed (block 808) it then goes to the Reconnect Party Placed On Hold mode of operation (block 809).

Figure 9:
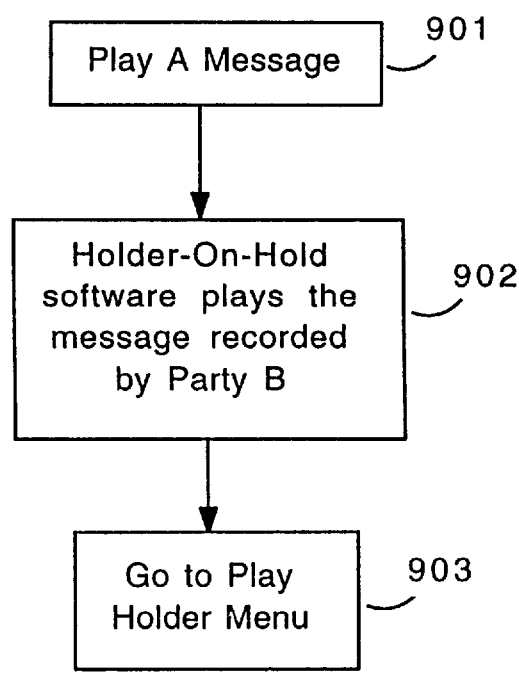

Referring now to FIG. 9 the holder-on-hold software enters the Play A Message mode of operation at block 901. In this mode of operation the holder-on-hold software plays the message that was previously recorded by Party B so it could be played to Party A (block 902). The holder-on-hold software then goes to the Play Holder Menu mode of operation (block 903).

Referring back to FIG. 7 the holder-on-hold software enters the Play Holder Menu mode of operation at block 701 and plays the menu of options available to Party A (block 702). The holder-on-hold software would then again go to the Holder Option Identifier Reception mode of operation (block 703).

Referring again to FIG. 8, if Party A wanted an advertisement to be played he would press the number 2 which would be detected in block 806 and the holder-on-hold software would then go to the Play An Advertisement To Holder mode of operation (block 807).

Figure 10:
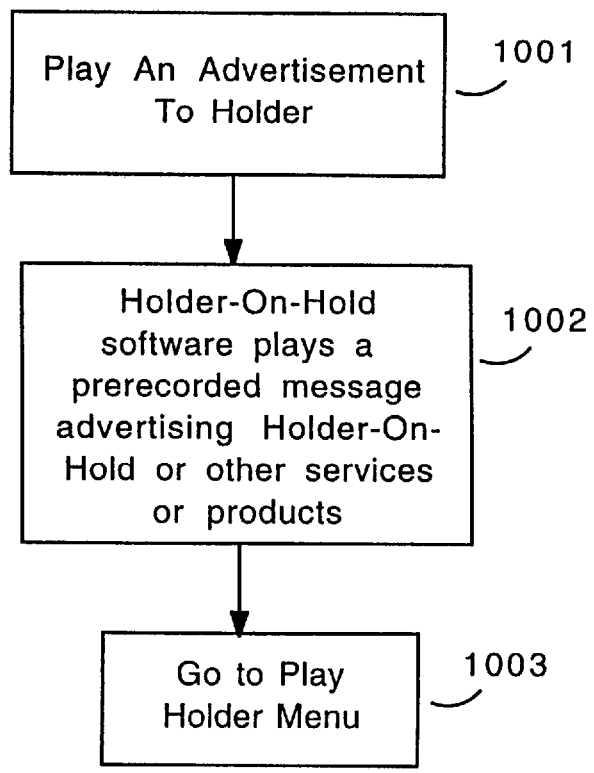

Referring now to FIG. 10 the holder-on-hold software enters the Play An Advertisement To Holder mode of operation at block 1001. In this mode of operation the holder-on-hold software plays a prerecorded message advertising the holder-on-hold service or other products and services as may have been prerecorded (block 1002). The holder-on-hold software then goes to the Play Holder Menu mode of operation (block 1003).

Referring again to FIG. 7 the holder-on-hold software enters the Play Holder Menu mode of operation at block 701 and once again plays the menu of options available to Party A (block 702). The holder-on-hold software then goes to the Holder Option Identifier Reception mode of operation once again (block 703).

Referring again to FIG. 8 if the holder, i.e., Party A wanted to be reconnected to the party he placed on hold, he would press the star button which would be detected in block 808 and the holder-on-hold software would then go to the Reconnect Party Placed On Hold mode of operation (block 809).

Figure 11:
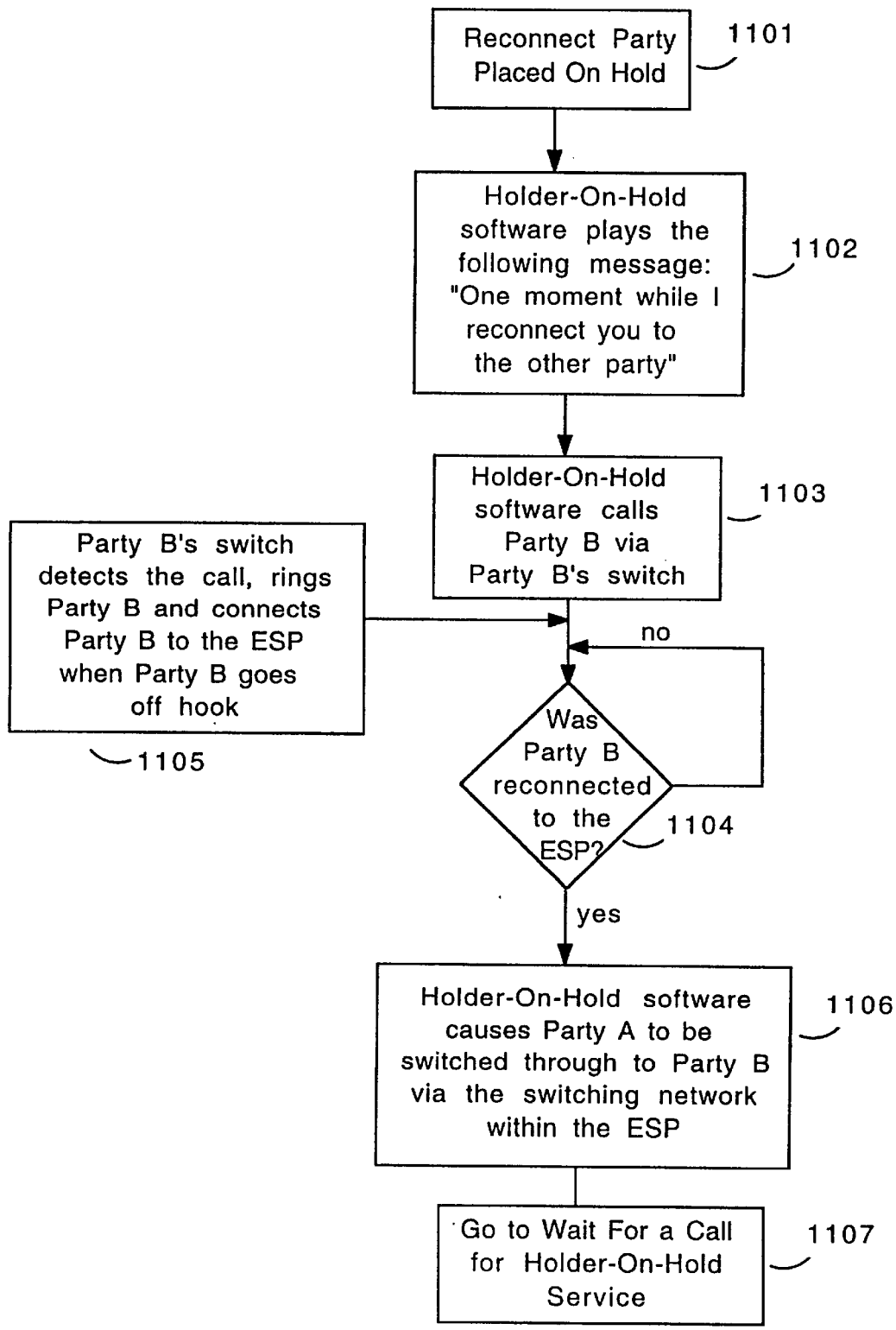

Referring now to FIG. 11 the holder-on-hold software enters the Reconnect Party Placed On Hold mode of operation at block 1101. In this mode of operation the holder-on-hold software plays a message to Party A asking him to wait a moment while he is reconnected to the other party, i.e., the party he originally placed on hold (block 1102). The holder-on-hold software then calls Party B via Party B's central office switch (block 1103) and waits for Party B to be reconnected to the ESP (block 1104). Party B's switch detects the call from the ESP and rings Party B's line. Party B's switch then connects Party B to the ESP when Party B goes off-hook in response to the ringing signal (block 1105). When the holder-on-hold software detects the connection of Party B to the ESP (block 1104) it causes Party B to be switched through to Party A via the switching network within the ESP (block 1106). Thus, Party A and B are reconnected and can continue their conversation. The holder-on-hold software then goes to the Wait For A Call For Holder-On-Hold Service mode of operation (block 1107).

The various instances of holder-on-hold software can communicate with each other and they do so through a message queue. At various points within the application programs each instance of holder-on-hold software checks the message queue to see if there are any messages for it. Messages for other instances are ignored while messages for that instance are processed upon retrieving them from the queue. The message format includes fields identifying the type of message, the directory number of the instance of holder-on-hold software it is directed to (i.e., the directory number of the associated user which is known by that instance of holder-on-hold software) the directory number associated with the instance of holder-on-hold software sending the message, the message text, and any other message specific parameters.

Figure 12:
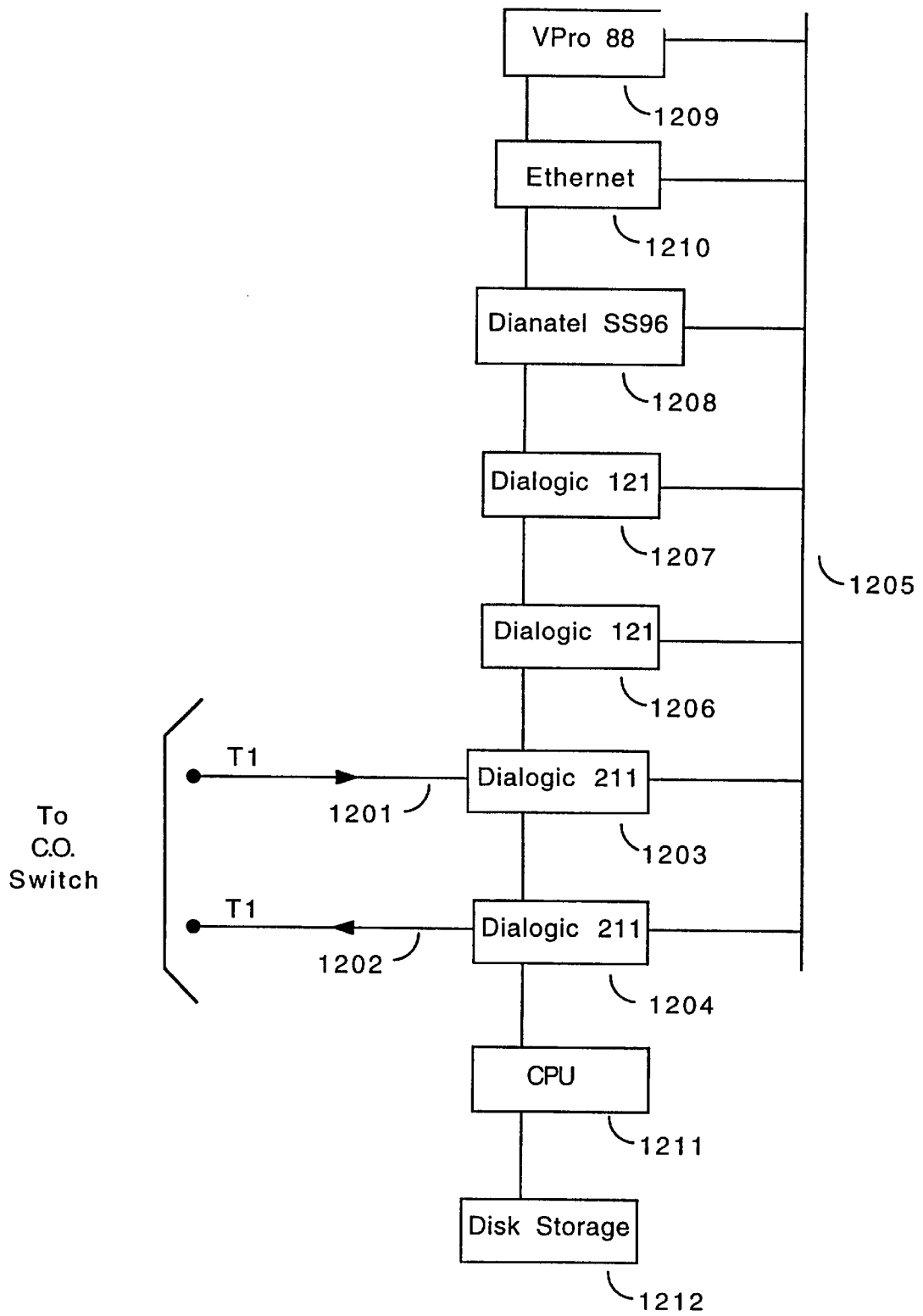
FIG. 12 is a block diagram of the Enhanced Services Platform of the present invention.

Referring now to FIG. 12, the ESP of the present invention is shown. The ESP interfaces with C.O. Switch 104 (FIG. 1) via incoming and outgoing T1 leads 1201 and 1202, respectively. Those leads are connected to Dialogic 211 cards 1203 and 1204, respectively, and they are also connected to voice bus 1205. Dialogic 121 cards 1206 and 1207, Dianatel SS96 card 1208, and V Pro-88 card 1209 are also connected to voice bus 1205. Ethernet 1210 is connected between Dianatel SS96 card 1208 and V Pro-88 card 1209. Dialogic 121 cards 1206 and 1207 are connected to each other and Dialogic 121 card 1207 is further connected to Dianatel SS96 card 1208. Dialogic 211 cards 1203 and 1204 are connected to each other and Dialogic 211 card 1203 is further connected to Dialogic 121 card 1206. CPU 1211 is connected between Disk Storage 1212 and Dialogic 211 card 1204.

Dialogic 211 cards 1203 and 1204 are interface cards to CO Switch 104 via T1 trunks 1201 and 1202, respectively. Dialogic 121 cards 1206 and 1207 are voice resources for playing prompt messages, collecting digits recording voice files and making phone calls. Dianatel SS96 card 1208 provides an internal switching network within the ESP to switch voice channels from the Dialogic 121 and 211 cards and the V Pro-88 card, which provides for voice recognition of answers to the prompt messages. CPU 1211 runs the operating system and application software of the holder-on-hold invention, and Disk Storage 1212 provides permanent storage for holder-on-hold software, voice files and data. Ethernet 1210 provides networking capability for the system to expand into multiple units.

The holder-on-hold software thus provides a novel arrangement for allowing a party placed on hold to access a service that allows him to hang up until the original party that placed him on hold has returned to the call.

Figure 13:
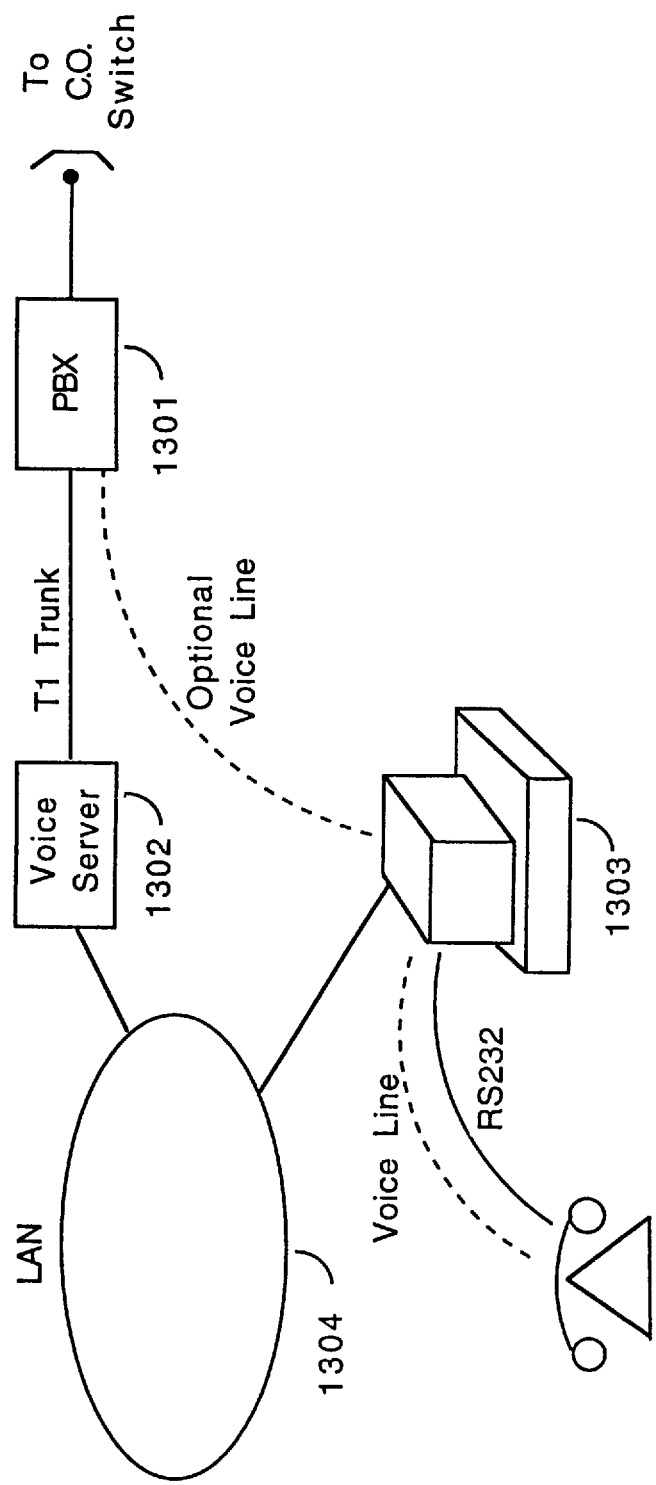
FIG. 13 is a block diagram of an alternative embodiment of the information-on-hold service of the present invention.

An alternative embodiment of the present invention is shown in FIG. 13. In that embodiment a subscriber's PC, i.e., Personal Computer, work station or other microcomputer, is used as the ESP. In FIG. 13 PBX 1301 is shown connected to Voice Server 1302 via a T1 trunk. Voice Server 1302 is further connected to PC 1303 via Local Area Network (LAN) 1304. In such an arrangement, known as computer telephony integration (CTI), calls come into PBX 1301 and go to Voice Server 1302, which contacts the subscriber via LAN 1304 and PC 1303. Using his keyboard or mouse, the subscriber tells PC 1303 to tell Voice Server 1302 to tell PBX 1301 how to handle the call, e.g., answer the call, take a message, put the call on hold, etc. In such an arrangement holder-on-hold software and associated ESP cards, e.g., Dialogic, etc., could be added to the PC to allow the PC to operate as the ESP. Another alternative embodiment would be to implement the holder-on-hold service within the CO switching system or other telecommunications network element. Thus, the ESP and holder-on-hold software could be implemented at various points in the telecommunications network to provide the features claimed in the present invention.

A further alternative embodiment of the present invention utilizes a "Direct call access" feature rather than the call transfer feature. In this arrangement the holder-on-hold subscriber calls the ESP directly, typically with a 7 digit telephone number. The ESP then asks what number to call and the holder-on-hold subscriber dials or keys in that number. The ESP then calls that number and the subscriber hangs up while the ESP maintains the call with the other party. All other aspects of the holder-on-hold service operate as previously described for the preferred embodiment.

This alternative embodiment applies best to telephone systems where call transfer is not available, for example many residential areas. It is also useful in small offices and with key telephone systems. Thus, the holder-on-hold service can also be accessed in various ways to provide the features claimed in the present invention.

It will be obvious to those skilled in the art that numerous modifications of the present invention could be made without departing from the spirit of the invention which shall be limited only by the scope of the claims appended hereto.

What is claimed is:

1. A hold-on-hold system for use with a switching system connected to a first party's telecommunication device and to the telecommunication device of a subscriber to hold-on-hold service who has been placed on hold by said first party, said switching system being operated to provide a hold-on-hold access signal in response to a request for hold-on-hold service by said subscriber, a hold-on-hold activation signal in response to a request to activate hold-on-hold service by said subscriber, a reconnection signal in response to a request by said first party to be reconnected to said subscriber, a connection between said subscriber's telecommunication device and said hold-on-hold system as requested by said hold-on-hold system, a disconnection of said subscriber's telecommunication device from said hold-on-hold system as requested by said subscriber, a connection between said first party's telecommunication device and said hold-on-hold system as requested by said subscriber, end a reconnection between said subscriber's telecommunication device and said hold-on-hold system as requested by said hold-on-hold system;

said hold-on-hold system comprising:
processing means; and
a network having a plurality of ports;
said processing means being operated in response to said hold-on-hold access signal to send a signal to said switching system requesting said switching system to connect said subscribers telecommunication device to one of said ports;
said processing means being further operated in response to said connection of said subscriber's telecommunication device to said port to send a message to said switching system instructing said subscriber to provide a particular response to request said switching system to provide said hold-on-hold activation signal;
said processing means being further operated in response to said hold-on-hold activation signal to send a message to said switching system instructing said subscriber to provide a particular response to request said switching system to disconnect said subscriber's telecommunication device from said one of said ports and to connect said first party's telecommunication device to one of said ports;
said processing means being further operated in response to said connection of said first party's telecommunication device to one of said ports to send a message to said switching system instructing said first party to provide a particular response to request said switching system to provide said reconnection signal;
said processing means being further operated in response to said reconnection signal, to send a signal to said switching system requesting said switching system to reconnect said subscriber's telecommunication device to one of said ports, and further operated in response to said reconnection of said subscriber's telecommunication device to one of said ports to connect said port connected to said first party's telecommunication device and said port connected to said subscriber's telecommunication device to each other, whereby said first party is reconnected to said subscriber.

2. A hold-on-hold system as claimed in claim 1, wherein said processing means is further operated in response to said connection of said subscriber's telecommunication device to said port to send a message to said switching system instructing said subscriber to provide a particular response to request said switching system to request the recording of a message for said first party.

3. A hold-on-hold system as claimed in claim 1, wherein said processing means is further operated in response to said connection of said subscriber's telecommunication device to said port to send a message to said switching system instructing said subscriber to provide a particular response to request said switching system to request the playing of an advertisement.

4. A hold-on-hold system as claimed in claim 2 wherein said switching system is further operated to request the recording of a message in response to a request therefor by said subscriber; said processing means being further operated in response to said request for recording a message to prompt said subscriber to speak a message for recording by said processing means.

5. A hold-on-hold system as claimed in claim 3, wherein said switching system is further operated to request the playing of an advertisement in response to a request therefor by said subscriber; said processing means being further operated in response to said request to play an advertisement to play a prerecorded advertising message.

6. A hold-on-hold system as claimed in claim 1, wherein said processing means is further operated in response to said connection of said first party's telecommunication device to said port to send a message to said switching system instructing said first party to provide a particular response to request said switching system to provide said reconnection signal.

7. A hold-on-hold system as claimed in claim 1, wherein said processing means is further operated in response to said connection of said first party's telecommunication device to said port to send a message to said switching system instructing said first party to provide a particular response to request said switching system to play a message recorded by said subscriber.

8. A hold-on-hold system as claimed in claim 1, wherein said processing means is further operated in response to said connection of said first party's telecommunication device to said port to send a message to said switching system instructing said first party to provide a particular response to request said switching system to request the playing of an advertisement.

9. A hold-on-hold system as claimed in claim 7, wherein said switching system is further operated to request the playing of a message recorded by said subscriber in response to a request therefor by said first party; said processing means being further operated in response to said request to play said message recorded by said subscriber to play said message recorded by said subscriber.

10. A hold-on-hold system as claimed in claim 8 wherein said switching system is further operated to request the playing of an advertisement in response to a request therefor by said first party; said processing means being further operated in response to said request to play an advertisement to play said advertisement.

\* \* \* \* \*